Aug. 10, 1937.  F. E. HARTMAN  2,089,793
APPARATUS FOR THE TREATMENT AND PURIFICATION OF LIQUIDS
Filed Jan. 4, 1934
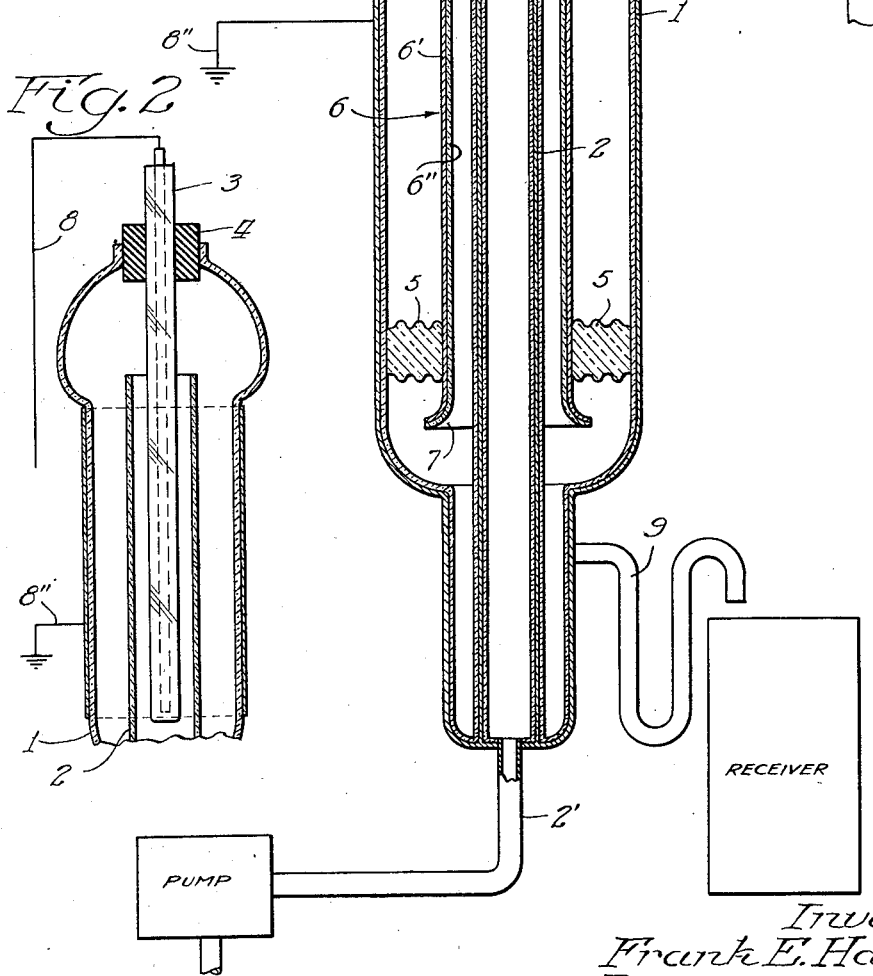

Patented Aug. 10, 1937

2,089,793

UNITED STATES PATENT OFFICE 2,089,793

APPARATUS FOR THE TREATMENT AND PURIFICATION OF LIQUIDS

Frank E. Hartman, Chicago, Ill., assignor, by mesne assignments, of seven-tenths to George H. Bergman Application January 4, 1934, Serial No. 705,202

5 Claims. (Cl. 204—25)

My invention has for its purpose the provision of an apparatus and method for the treatment and purification of liquids by the use of electric discharge in the presence of a liquid.

One purpose of the invention is the provision of means whereby a liquid may be subjected to relatively intense electronic and ionic bombardment with a view of catalyzing or supporting reactions that are of a desirable nature between the several discrete components of the liquid. It is also contemplated in this connection that the liquids to be treated may be treated either in the presence of an inert atmosphere or in the presence of a gas, which, activated by the electrical forces, causes a change in the condition of the treated liquid.

My invention contemplates also the provision of an apparatus of this character which may be utilized for the treatment of liquids containing colloidal particles in suspension so as to ionize or charge the colloidal particles for the purpose of stabilizing the suspension or preventing agglutination of said colloidal particles.

It is a further object of the invention to provide an apparatus for the treatment of liquids with electronic and ionic bombardment with a view of producing a homogenization effect especially between liquids which remain miscible when fine division and good distribution is once obtained.

My invention contemplates also the provision of an apparatus for the treatment of liquids with ozone and/or highly activated or ionized oxygen with a view of oxidizing certain impurities contained in the liquid.

In the specific form of the invention as disclosed, it contemplates the provision of an apparatus and method which makes it possible to purify water and similar liquids by means of highly activated oxygen or ozone as a continuous process which effects a great economy in the power and in the quantity of oxygen used.

The following are offered as examples of the practical applications of the apparatus comprehended by this invention, but it is to be understood that such examples as are here given are purely for the purpose of illustration and are not to be considered as limiting the scope of the invention herein disclosed.

As an example of the treatment of liquids with ozone, we may take the case of water for potable purposes. Surface water is contaminated with germ life and practically always requires purification before it is safe for human consumption. In addition to germ life, surface waters frequently carry large quantities of humus and peaty matter in colloidal suspension and in solution, as well as a variety of industrial wastes, such as phenols and tarry acids, etc., all of which are best removed by a process of oxidation. Ozone has long been used in the arts for the purification of water, etc., however, it has always been the practice to produce the ozone in separate generators, and to supply separate devices for mixing the ozone with the water. When ozone is thus generated, it is essential that the air from which the ozone is produced be perfectly dry since in the presence of moisture the discharge which produces the ozone is subject to sparking, and such sparking gives rise to secondary products, oxides of nitrogen from air, etc., that are destructive of the ozone generator parts. In the apparatus of the present invention, the ozone is produced on and about the very surface of the water to be treated, without the use of separate generators and mixers, and no requirements as to the drying of the oxygen from which ozone is to be produced are indicated. This makes for economy of investment, operating costs, and reduces the care to a negligible quantity, as compared with existing ozonizers.

As a further example of the treatment of liquids with ozone, oils, such as the drying oils, are frequently treated with ozone to increase the viscosity through the formation of oxidation products, linoxyn in the case of the presence of linoleic acid in the oil, and thus produce a partially predried oil which greatly accelerates the ultimate drying time of the oil when used in the production of paints, varnishes, linoleum and the like. Oils may be readily treated in the apparatus of this invention, as will become obvious from the description of the apparatus below.

It is well known that corpuscular rays, i. e. electrons traveling with a very high velocity produced by their fall through a large potential difference, ionized gas molecules also traveling with high velocity, etc., can effect chemical changes that ordinarily would not occur in the absence of a definite promoting force between the substances, and that also corpuscular rays will support and accelerate reactions that ordinarily would occur at a very much slower rate in the absence of a promoting or catalyzing force. It is a very definite object of this invention to utilize this effect of corpuscular rays on the liquids to be treated, that is inherent to the apparatus. As an example of the practical application of this, we may remain in the field of beverages and take wines and potable spirituous liquors, commonly brought to maturity by long aging.

In spirituous liquors, the mixed aldehydes formed during the initial fermentation should be oxidized to their corresponding acids; reaction should take place between the acids and alcohol with the formation of characteristic esters, to which the flavour and bouquet of a spirit is largely due. The volatile essential oils of the grains, fruits, etc., carried over with the distillate, need to be finely divided and dispersed throughout the liquor as an essential adjunct to the development of the ultimate characteristic bouquet and flavour of the liquor, wine, etc.

All of these requirements are greatly assisted to their ultimate end by the apparatus of this invention. The electronic and ionic bombardment in the presence of a controlled oxidizing atmosphere can be made to oxidize the aldehydes to the acid without appreciable attack of the alcohol itself. In the absence of the proper control of the oxidizing effect, much of the alcohol would be attacked and converted into aldehyde, and ultimately acid, with accompanying too great an ultimate acid content. The action of the corpuscular rays supports the reaction between the acid and alcohol, thus causing the initiation of the esterification process which ordinarily required long standing, and its progress to ultimate maturity is greatly accelerated by such treatment. The physical bombardment of the liquor surface with the high speed electrons and molecules acts to finely divide oil particles such as would be dispersed in a relatively gross state through the liquor and thus the essential oils, carried over in the distillate, are more finely divided and evenly dispersed, or homogenized with the main liquor body. It is seen, therefore, that the apparatus of this invention comprehends the entire scope of forces or agencies required for the rapid maturing of spirituous liquors, wines, beers, etc.

As a final example of the stabilizing of colloidal suspensions, etc., we may take the cases of certain serums, and colloidal medicaments employed for intravenous and subcutaneous injection. Such solutions may be treated in the apparatus of this invention, in the presence of a chemically inert gas, so that the action is confined to that of dispersion and ionization of the particles to be stabilized. In such cases, the liquid to be stabilized should be treated with a uni-directional current, making the liquid phase the proper polarity required for giving the proper normal charge to the particles in question.

Having pointed out the practical utility of the apparatus of this invention, we will now deal with a description of a typical embodiment of the apparatus. In the following figures, like numerals refer to like parts throughout the drawing, of which:

Fig. 1 is a view partly in elevation and partly in cross section of the apparatus; and Fig. 2 is a fragmentary view illustrating a slightly modified form of the invention.

A steel shell 1, lined over its entire inner surface with glass enamel, serves as the general enclosure. A stand pipe, or riser 2, also of steel, and coated both inside and out with glass enamel is located at the center and concentric with 1, the junction of 2 with 1 being liquid tight at the bottom. It will be noted that 2 does not extend to the top of 1, but terminates some distance from the same. Insulators, designated as 5, are fastened to the inner surface of the shell 1, and in turn support a second electrode assembly, designated generally as 6. This electrode assembly 6 is circular and positioned concentric with the riser tube 2, and does not extend the entire length of 2. This electrode assembly comprises two parts, a metallic electrode plate 6' and a glass coating 6". This assembly may be a steel cylinder, shaped as shown, and glass coated on both surfaces, or it may comprise a cast glass cylinder on the outer surface of which metal is sprayed to form the electrode. It is also pointed out that this assembly is flared at both ends, with soft radii as indicated at 7. The purpose of this flare is to provide a gradual widening of the polar space between electrode 6' and riser 2 at the ends of 6' and thus prevent intensified discharges from the edges of 6' which would occur were not the edges of 6' thus flared. This is common practice in the arts for the preventing of so-called edge effects in high potential and high frequency discharges.

Electrical connection with 6' to the outside of the shell 1 is provided by the conductor 8 which passes through one of the insulators 5 and connected with 6'.

The riser 2 terminates in an inlet pipe 2' which, in turn, is connected with a pump or other suitable means of supplying the apparatus with measured quantities of liquid.

Liquid outlet from the shell 1 is provided through the U tube 9, this tube being so constructed that it permits the outflow of liquid from 1 when the level has collected in 1 to a point immediately above the opening between 9 and 1, but a supply of liquid is always trapped in 9 so that gas under substantially atmospheric pressure within 1 cannot escape, nor can air from the atmosphere enter 1 through 9.

A gas entry port 10 is provided near the top of 1, and connects with any suitable gas reservoir or tank, through a pressure regulating valve 11, so that a constant and slightly elevated pressure of any desirable gas or mixture of gases may be held within 1. This completes the general construction of the apparatus, though modifications may be introduced by necessity of the manner in which the apparatus is operated, as will now be described in detail.

The liquid to be treated is delivered to the riser 2 by any suitable agency, such as a constant level gravity tank, or, as in the instance of the illustration, a pump. All that is necessary is that the liquid be supplied at a constant and controllable rate of flow. The liquid rises in 2 and flows over the top periphery, the rate of flow being so regulated as to spill down in a uniformly thin film, adhering to the outer surface of 2. When a sufficient amount is collected in the bottom to rise to the level of the opening 9, it will run out into the U tube trap; and, when the trap is full, liquid will be discharged into any suitable container situated to receive the treated liquid. This flow will continue in this manner so long as liquid is supplied to the apparatus. In some cases, it may be desirable to extend the downward delivery pipe of 9 so that the trap syphons practically empty, thus discharging a little of the gas within 1 with each delivery of liquid; while in other cases, it may be desirable to shorten the downward delivery tube of 9 so as to hold the gas content of 1 sealed within the shell at all times.

The gas content of 1 is maintained through a pressure regulating valve so that any desired pressure of gas may be maintained within 1, and the gas reservoir may contain any desirable gas or mixture of gases. On the other hand, it may be desirable to provide two or more gas reservoirs, so that one gas may be fed to one in greater proportion than to another. This becomes desirable in the case of controlled oxidation. Nitrogen or $CO_2$ may be used as the inert phase, and oxygen may be supplied at a greater rate than the inert phase since oxygen would be used up in the reactions.

We now come to the electrical operation of the apparatus. The electrode 6' is connected through the lead wire 8, which is insulated from the shell of the apparatus by the insulator 5 and insulator 8', to one side of a source of high potential electric current, or as may be required by variation in the design of the apparatus, to one side of a source of high frequency electric current of the required potential. In either case, the shell 1 of the apparatus is connected with earth, this in turn places the riser 2 at the earth potential, and the opposite side of the electrical supply source is earthed. It may be well to state here the conditions which govern the use of high potential at ordinary frequencies, say 60 cycles, and high potential unidirectional current, or high frequency current. It becomes obvious, on simple inspection of the drawing, that the electric circuit formed by the mode of connecting the apparatus with the electrical source is that of a condenser. Its resistance to the flow of current through the circuit is capacitive reactance. Condenser circuits follow the well known equation:

$$R = \frac{1}{2\pi f C}$$

where:

R = reactance of capacity (expressed in ohms);
f = frequency of alternating current in cycles;
C = capacity in farads.

The condenser formed by the apparatus in question comprises three types of dielectrics: Solid—the glass coating of the electrodes; liquid—the liquid to be treated, flowing down the outside of 2; and gaseous—the gas film between 6' and the liquid surface of 2. In the operation of such a condenser, granting that the solid dielectric, which is a factor of initial construction, remains constant, the overall reactance of the condenser will vary with the nature of the liquid flowing down 2 and the thickness and nature of the gas pressure film between 6' and the surface of 2. The object to be accomplished in the treatment of liquids is to bring into action sufficient flow of current to either produce the required chemical change within the liquid or between the liquid and the superimposed gas film, or to set up the required electron and ion flow to give the liquid surface the required amount of corpuscular bombardment. In a word, to produce certain optima current densities across the gap of the condenser. Where the gas film is thick and the liquid has a high specific dielectric effect, exceedingly high potentials may be required to overcome the reactance and to set up the required current flow. This potential may be so high that the stress on the insulation, together with the need of relatively enormous spacing of 6' from 1, may render the operation of the apparatus hazardous and costly of construction.

Recurring to the equation governing condenser circuits, we see that the only way to reduce R is to increase the values below the viculum of the right hand term. The value of $2\pi$ is fixed, as will be the value of C for any given apparatus and liquid to be treated. Hence it is seen that only $f$ is a variable. In order, then, to avoid exceedingly high operating potentials, recourse may be had to the employment of higher frequencies in the operation of the apparatus, any suitable type of current supply being comprehended within the scope of this invention. For instance, in the treatment for water, ordinary 60 cycle current at a pressure of 12,000 to 14,000 volts suffices to give the required current density for adequate purification; whereas in the treatment of many liquids of high specific dielectric capacity, such as the higher alcohols, and especially in the presence of an inert gas, pressure in the order of 100,000 volts is required. Hence in such latter cases recourse to higher frequencies is economically indicated.

Let us now deal with the operation of the apparatus. A liquid, say water, is fed to the apparatus, by the pump, at such a rate as to cause 2 to overflow with an exceedingly thin film running down its outer surface. Since the object here is to produce high concentrations of ozone and active oxygen, the shell 1 is filled with oxygen, and a source of oxygen supply is left to ride on the apparatus, through a pressure regulating valve, so that oxygen is replenished immediately it is used, or carried away with the water. The current is turned on and a brush discharge is set up from 6' to 2, thus passing through the water film. The brush discharge is exceedingly active in producing ozone, and as the ozone is produced in relatively high concentrations, seven- to eightfold that produced in ordinary commercial ozonizers, and hence at a high partial pressure, a relatively high solubility of ozone in the water film results. Equilibrium conditions obtain for any given current density between 6' and 2 since the oxygen phase approximates stagnation whereby the rate of breakdown of the ozone equals the rate of formation by the discharge, and higher concentrations may not be obtained. It is desirable to regulate the current density within the condenser at the upper values of the limiting equilibrium so as to derive the benefit of the maximum possible ozone concentration with the most economical current consumption. As the ozonized water collects in the bottom of 1, it is discharged to any suitable container so soon as it rises to the level of the trapped overflow. The trap will retain sufficient water to hold the gas entrapped within 1, hence there is no loss of oxygen.

When ozone is made from moist air, oxides of nitrogen, which dissolve in the water and are ultimately oxidized to nitric acid, are formed. Hence in present art it is always the practice to dry air from which ozone is to be made. This precaution is two-fold: it not only avoids the introduction of mineral acid in the water, but further serves to protect the ozone generator which becomes quickly destroyed through the nitric acid formed along with the ozone from moist air. In the process of producing ozone from air, in the type of apparatus now used in the arts for water purification, concentrations of no more than 0.5% are attained. Employing the same type of apparatus, but replacing air with pure oxygen, concentrations of 1.5% would be obtained. Only several parts per million by weight of ozone are required to purify water, but, due to the fact that the solubility of a gas in water is a function of its partial pressure, much larger quantities of ozone must be brought into contact with the water in order to obtain the required uptake of ozone by the water to give proper purification. The process of purifying water by ozone in the conventional type of apparatus, which makes the ozone in a separate generator and then mixes it with the water by mechanical means, is extremely wasteful of ozone. Hence, it is not economically feasible to employ pure oxygen for making ozone for such purposes. In the present water ozonizers, 99.5% of the gas passed through the ozone generator is lost entirely. Of the remaining 0.5% which is converted into ozone, 66⅔% is wasted as excess ozone required to give an adequate ozone uptake to give proper purification. It is here that the apparatus of this invention offers the greatest possible economy in the purification of water by ozone. It now becomes economically feasible to use pure oxygen from which to make the ozone, thus doing away with the costly air drying operation since oxides of nitrogen cannot be formed from pure oxygen. No oxygen is lost since the only way that it can escape from the apparatus is through utilization in the purification operation and in solution in the water. The excess necessary for the proper degree of solubility of ozone in the water is retained within the apparatus and is not discharged to atmosphere and lost as in conventional ozonizers of the present art. It may be pointed out that by the replacement of air by pure oxygen in the production of ozone by the brush discharge, a three-fold concentration and yield is obtained for the same energy expenditure. In addition to this, however, when ozone can be utilized at the very instant of its formation, a further economy becomes possible since there is a very great breakdown of the initial concentration produced by the discharge which breakdown occurs in a period of the order of a fraction of a second. Hence when ozone is produced in a separate generator and must be transported to the point of use, ozone is lost by so-called catalytic decomposition to the extent of several-fold the ultimate quantity available from conventional ozonizers. Actual measurements on the apparatus of this invention yielded an increase in the effective ozone yield of in excess of seven fold that of the conventional apparatus for the same energy input to the ozone generator, and in addition effected the greater economy of saving the very large energy required for drying air.

In the processing of spirituous liquors for the acceleration of maturity, it is desirable to include oxidation but to a very much lesser degree than in the purification of water or processing drying oils, etc. In this case, a mixture of oxygen and an inert gas, say $CO_2$, or some of the inert hydrocarbon gases is employed, the oxygen content being adjusted to give the required oxidizing activity to the gas mixture for the current density employed. This may be accomplished by the initial filling of 1 with the gas mixture in proper proportions and then allowing a reserve supply of oxygen to ride on the apparatus through a pressure regulating valve so that only oxygen is supplied as it is used up. If necessary, stirring means for homogenization of the gas mixture may be provided in 1.

In cases where the corpuscular bombardment is intended for homogenization purposes, an inert gas such as nitrogen or neon, for instance, may be flooded into 1, and thus chemical action between the gas phase and liquid phase will not occur. Where activated nitrogen would react with the liquid, the noble gases are best employed.

For laboratory use and in the treatment of serum, etc., very small apparatus may be advantageous. In such cases, the entire apparatus may be blown from suitable glass such as Pyrex. In the case of glass apparatus such as shown in Fig. 2, the electrode 6' may be located on the outside of shell 1, and the annulus between 1 and 2 greatly reduced. If 1 is metal coated, for the required length, by any suitable process such as the Schott process for instance, this metal coating will serve as 6', and may be earthed, making the inner electrode at high potential above ground. Since 2 will be of glass, it cannot act as the required second electrode. A vacuum electrode of glass, as indicated at 3 of Fig. 2 may be employed and brought into 1 through the tubulure 4. The condenser then exists between the metallic coating on the outer surface of 1 and the vacuum electrode 3, located within 2 and concentric therewith.

In some cases, due to incipient chemical changes in the gas, it may be desirable to bleed a small quantity of gas through the apparatus at all times. This can be done either with an escapement valve, or the outlet tube of the trap 9 may be so prolonged that it siphons a quantity of liquid from the trap, thus leaving with each discharge a space in 9 to become gas filled while the liquid is rising to a new level in 1, and in this way a measured quantity of gas may be discharged with each discharge of liquid.

It is believed that an adequate description has been given to permit those skilled in the art to practice the teachings of this invention, and it is to be pointed out that the versatility of the underlying principles of this apparatus, both as to apparatus modification and application for useful purposes in the arts, are almost limitless. Hence the examples here given are for illustration only and must not be construed to limit the scope of the invention, but that all obvious equivalents are included, and the invention shall be limited in its claims only insofar as prior art may bear on same.

Having thus described my invention, what I claim as new and desire to secure by Letters Patent is:

1. A liquid treating apparatus comprising a metal container having therein an upstanding tube serving as a liquid inlet, said tube having a center of conducting material covered with a dielectric material, and the interior of said container being covered with a dielectric material, a second tube within the container surrounding the first tube and spaced therefrom, said second tube being provided with a dielectric inner surface and conducting material around the dielectric inner surface, a liquid outlet for said container, and electrical connections for supplying alternating current to said tubes.

2. A liquid treating apparatus comprising a metal container having therein an upstanding tube serving as a liquid inlet, said tube having a center of conducting material covered with a dielectric material, and the interior of said container being covered with a dielectric material, a second tube within the container surrounding the first tube and spaced therefrom, said second tube being provided with a dielectric inner surface and conducting material around the dielectric inner surface, a liquid outlet for said container, and electrical connections for supplying alternating current to said tubes, said container having a gas inlet thereto, and said liquid outlet having a liquid trap therein for retaining the gas while liquid flows out.

3. A liquid treating apparatus comprising a metal container having therein an upstanding tube serving as a liquid inlet, said tube having a center of conducting material covered with a dielectric material, and the interior of said container being covered with a dielectric material, a second tube within the container surrounding the first tube and spaced therefrom, said second tube being provided with a dielectric inner surface and conducting material around the dielectric inner surface, a liquid outlet for said container, and electrical connections for supplying alternating current to said tubes, the ends of one of said tubes being curved away from the other tube.

4. A liquid treating apparatus comprising a metal container having therein an upstanding tube serving as a liquid inlet, said tube having a center of conducting material covered with a dielectric material, and the interior of said container being covered with a dielectric material, a second tube within the container surrounding the first tube and spaced therefrom, said second tube being provided with a dielectric inner surface and conducting material around the dielectric inner surface, a liquid outlet for said container, and electrical connections for supplying alternating current to said tubes, the ends of said second tube being flared outwardly, but the distance between said flared ends and the container being substantially greater than the distance between the tubes.

5. A liquid treating apparatus comprising a container having a liquid inlet at its bottom, a tube extending upwardly from said inlet, said tube being of conducting material covered inside and outside with a dielectric material, an electrode member of conducting material encircling said tube and spaced therefrom, means for connecting said tube and said member to a source of electricity, and a liquid outlet from said container below the level of said member.

FRANK E. HARTMAN.